United States Patent
English et al.

(10) Patent No.: US 8,319,470 B2
(45) Date of Patent: Nov. 27, 2012

(54) STAND ALONE SOLAR BATTERY CHARGER

(75) Inventors: Peter English, Aliso Viejo, CA (US); Richard E. Sanett, Pacific Palisades, CA (US); Steven R. Brimmer, Thousand Oaks, CA (US)

(73) Assignee: SunCore, Inc., Irvine, CA (US)

( * ) Notice: Subject to any disclaimer, the term of this patent is extended or adjusted under 35 U.S.C. 154(b) by 363 days.

(21) Appl. No.: 12/705,495

(22) Filed: Feb. 12, 2010

(65) Prior Publication Data

US 2011/0199040 A1    Aug. 18, 2011

(51) Int. Cl.
*H01M 10/44* (2006.01)
*H01L 31/042* (2006.01)

(52) U.S. Cl. ....................... 320/101; 136/244
(58) Field of Classification Search .................. 320/101; 136/244
See application file for complete search history.

(56) References Cited

U.S. PATENT DOCUMENTS

| | | | |
|---|---|---|---|
| 3,571,604 A | 3/1971 | La Porta et al. | |
| 3,735,242 A | 5/1973 | Andersen | |
| 4,243,928 A | 1/1981 | Nazimek | |
| 4,684,876 A | 8/1987 | Creel | |
| 5,506,496 A | 4/1996 | Wrathall et al. | |
| 5,648,766 A | 7/1997 | Stengel et al. | |
| 5,729,335 A | 3/1998 | Green | |
| 5,734,252 A | 3/1998 | Griffin et al. | |
| 5,869,949 A * | 2/1999 | Nishikawa et al. | ........... 320/101 |
| 5,969,508 A | 10/1999 | Patino et al. | |
| 6,437,549 B1 | 8/2002 | Takagishi | |
| 6,462,507 B2 | 10/2002 | Fisher, Jr. | |
| 6,586,915 B1 | 7/2003 | Reeves et al. | |
| 6,608,482 B2 | 8/2003 | Sakai et al. | |
| 6,653,820 B1 | 11/2003 | Smith | |
| 6,967,469 B2 * | 11/2005 | Yamamoto et al. | ........... 320/137 |
| 7,095,213 B2 | 8/2006 | Weng | |
| 7,145,314 B2 * | 12/2006 | Aradachi et al. | ............. 320/150 |
| 7,514,900 B2 | 4/2009 | Sander et al. | |
| 2003/0159728 A1 | 8/2003 | Berry | |
| 2006/0164031 A1 | 7/2006 | Leem | |

(Continued)

FOREIGN PATENT DOCUMENTS

EP    1 246 340 A1    10/2002

(Continued)

OTHER PUBLICATIONS

Texas Instrument; bq24120 datasheet for "Single-Chip Switchmode, Li-Ion and Li-Polymer Charge-Management IC with Enhanced EMI Performance"; revised Aug. 2008; 37 pages.

(Continued)

*Primary Examiner* — M'Baye Diao
(74) *Attorney, Agent, or Firm* — Knobbe Martens Olson & Bear LLP (57) ABSTRACT

A portable solar battery charger comprises a photovoltaic array, a power regulator, a controller, and a battery. In one embodiment, the controller is configured to increase the charging current provided by the power regulator to the battery over time using discrete current levels. A comparator can compare the voltage of the photovoltaic array to a threshold, and provide the result to the controller. The controller can be configured to decrease the current to a previously selected level when the comparator indicates the voltage of the photovoltaic array is below a threshold, thereby improving the efficiency of the current delivery to the battery.

1 Claim, 8 Drawing Sheets

U.S. PATENT DOCUMENTS

| | | | |
|---|---|---|---|
| 2006/0174939 A1 | 8/2006 | Matan | |
| 2006/0249195 A1 | 11/2006 | Taylor | |
| 2006/0267543 A1 | 11/2006 | O'Donoghue | |
| 2007/0069685 A1 | 3/2007 | Sato | |
| 2007/0095384 A1 | 5/2007 | Farquhar et al. | |
| 2007/0216365 A1 | 9/2007 | Sakurai et al. | |
| 2007/0222410 A1 | 9/2007 | Lee | |
| 2008/0119140 A1 | 5/2008 | Maligeorgos et al. | |
| 2008/0315828 A1* | 12/2008 | Lu et al. | 320/101 |
| 2009/0020149 A1 | 1/2009 | Woods et al. | |
| 2009/0039827 A1 | 2/2009 | Fowler | |
| 2009/0284216 A1 | 11/2009 | Bessa et al. | |
| 2010/0013428 A1 | 1/2010 | Shin | |

FOREIGN PATENT DOCUMENTS

| | | |
|---|---|---|
| EP | 1 414 100 A1 | 4/2004 |
| JP | 05-122859 | 5/1993 |
| JP | 2008-090672 | 4/2008 |

OTHER PUBLICATIONS

Texas Instrument; bq24150 datasheet for "Fully Integrated Switch-Mode One-Cell Li-ion Charger with Full USB compliance and USB-OTG Support"; Jun. 2008; 39 pages.

International Search Report and Written Opinion, dated Apr. 6, 2011, in PCT Appl. No. US2011/024093, filed Feb. 8, 2011.

Kim et al., *State Estimator Design for Solar Battery Charger*, IEEE International Conference on Industrial Technology, ICIT 2009, 6 pages.

Jiang et al., *Multiobiective MPPT/Charging Controller for Standalone PV Power Systems under Different Insolation and Load Conditions*, Industry Applications Conference 2004, 39th IAS Annual Meeting; p. 1154-1160.

Chiang et al., *Modeling and Control of PV Charger System With SEPIC Converter*, IEEE Transactions on Industrial Electronics, vol. 56, No. 11, Nov. 2009; p. 4344-4353.

O'Mara, *Design and Fabrication of a Prototype ½ KW Smart Array Controller*, IECEC Proceedings on the 32nd Intersociety Energy Conversion Engineering Conference, vol. 3, No. 27, Jul. 1997; p. 1569-1574.

Texas Instruments; bq24120 datasheet for "Single-Chip Switchmode, Li-Ion and Li-Polymer Charge-Management IC with Enhanced EMI Performance"; revised Aug. 2008; 37 pages.

Texas Instruments; bq24150 datasheet for "Fully Integrated Switch-Mode One-Cell Li-Ion Charger with Full USB compliance and USB-OTG Support"; Jun. 2008; 39 pages.

\* cited by examiner

FIG. 8

STAND ALONE SOLAR BATTERY CHARGER

INCORPORATION BY REFERENCE

U.S. design patent application No. 29/355,789, titled STAND ALONE BATTERY CHARGER (Inventor: Richard E. Sanett: is being filed on even date herewith and the disclosure thereof is hereby incorporated herein by reference in its entirety.

BACKGROUND

This disclosure relates generally to battery charging circuits for portable user devices.

Portable user devices (e.g., laptop computers, cameras, cell phones, PDAs, GPS units, music player devices, and other hand-held devices) can have batteries that need recharging. Typically, a user may recharge the batteries of portable user devices using AC adapters or other tethered charging systems. Although AC adapters or similar charging systems can be a useful means for a user to recharge the batteries of a user device, it may be difficult or impossible for a user to find a wall outlet at a given time. Additionally, a portable user device can have an adapter specific to the device. If a user wishes to be able to recharge the batteries of a multitude of portable user devices, a user may need to be in possession of a variety of adapters, which may prove difficult for a user to transport or store.

There is a need for a charger that is compatible with a multitude of portable user devices. Furthermore, there is a need for a charger which does not require access to a wall outlet for operation. Moreover, there is a need for a charger which can efficiently recharge the batteries of portable user devices.

SUMMARY

In one embodiment, an apparatus for charging a battery is disclosed. The apparatus comprises a photovoltaic array for generating power from electromagnetic radiation, a monitoring circuit configured to compare the voltage at the photovoltaic array to a threshold voltage and to generate a comparison signal based on the comparison, a charging circuit configured to draw a charging current from the photovoltaic array and to make the charging current available to the battery, and a control circuit. The control circuit is configured to receive the comparison signal and to control the charging circuit. The control circuit is also configured to direct the charging circuit to generate a charging current of a first amplitude at a first time and to direct the charging circuit to increase the charging current from the first amplitude to a second amplitude at a second time. Additionally, the control circuit is configured to direct the charging circuit to decrease the charging current from the second amplitude to the first amplitude at a third time if the comparison signal indicates that the voltage at the photovoltaic array is less than that threshold voltage at the third time. The threshold voltage is selected such that when the comparison signal indicates that the voltage at the photovoltaic array is less than that threshold voltage at the third time, the first amplitude is equal to about the amplitude of a current at maximum power of the photovoltaic array at the third time.

In another embodiment, a method is provided for charging a battery. The method comprises generating power from electromagnetic radiation using a photovoltaic cell, drawing a charging current having a first amplitude from the photovoltaic cell, increasing the amplitude of the charging current from the first amplitude to a second amplitude, comparing the voltage at the photovoltaic cell to a threshold voltage, decreasing the charging current from the second amplitude to the first amplitude if the voltage at the photovoltaic cell is less than the threshold voltage, and making the charging current available to the battery. Drawing the charging current having the first amplitude, increasing the amplitude of the charging current, comparing the voltage at the photovoltaic cell, decreasing the charging current, and making the charging current available to the battery are performed during a first window of time.

In another embodiment, an apparatus for charging a battery to a target voltage is disclosed. The apparatus comprises a photovoltaic array for generating power from electromagnetic radiation, a monitoring circuit configured to compare the voltage at the photovoltaic array to a threshold voltage and to generate a comparison signal based on the comparison, a charging circuit configured to draw a charging current from the photovoltaic array and to make the charging current available to the battery, and a control circuit. The control circuit is configured to receive the comparison signal and to calibrate the amplitude of the charging circuit and to calibrate the amplitude of the charging current to a first amplitude at a first time using the comparison signal. The first amplitude is equal to about the amplitude of a current at maximum power of the photovoltaic array at the first time. The control circuit is configured to periodically calibrate the amplitude of the charging current until the voltage of the battery is equal to about the target voltage.

In another embodiment, a method of charging a battery to a target voltage is disclosed. The method comprises generating power from electromagnetic radiation using a photovoltaic cell, drawing a charging current from the photovoltaic cell, making the charging current available to the battery, comparing the voltage at the photovoltaic cell to a threshold voltage to generate a comparison signal, and calibrating the charging current to an amplitude equal to about the amplitude of a current at maximum power of the photovoltaic array using the comparison signal. Calibrating the charging current is repeated periodically until the voltage of the battery is equal to about the target voltage.

In another embodiment, a computer-readable storage media is disclosed. The computer-readable storage media comprises instructions, which when executed by a processor, operate to charge a battery. The computer-readable storage media comprises instructions for drawing a charging current from a photovoltaic cell, instructions for comparing the voltage at the photovoltaic cell to a threshold voltage and to generate a comparison signal, and instructions for periodically calibrating the amplitude of the charging circuit at a multitude of times using the comparison signal, wherein the amplitude at each time is equal to about the amplitude of a current at maximum power of the photovoltaic array at each time.

In another embodiment, a battery charger is disclosed. The battery charger comprises a photovoltaic array having a first face adapted to receive light and a second face opposite the first face. The battery charger further comprises a first body portion having an opening therethrough, wherein the opening is configured to allow light to reach the first face of the photovoltaic array, and a second body portion, wherein the second body portion is mateable with the first body portion along a parting plane running substantially parallel to a plane containing the mouth of the opening. The battery charger further comprises a redistribution layer configured to electrically connect to the second face of the photovoltaic array, a battery, and a heat sink positioned between the battery and the photovoltaic array, wherein the heat sink is configured to absorb thermal energy emanating from the photovoltaic array. The battery charger further comprises a printed circuit board having at least one integrated circuit, wherein the printed circuit board is configured to electrically connect to the battery and the redistribution layer and a display configured to be visible through the opening of the first body portion. When the first and second body portions are assembled, the first and second body portions define a cavity containing the PV array, the redistribution layer, the battery, the heat sink, the printed circuit board, and the display.

In another embodiment, a battery charger for efficiently charging a multitude of user devices over a plurality of lighting conditions is disclosed. The battery charger comprises a battery, a photovoltaic array for generating power from electromagnetic radiation, a charging circuit configured to draw a charging current from the photovoltaic array and to make the charging current available to the battery, an interface for providing charge from the battery to at least one of the multitude of user devices, and a microcontroller configured to select the amplitude of the charging current. The microcontroller is configured to periodically calibrate the amplitude of the charging current to an amplitude which is equal to about the amplitude of a current at maximum power of the photovoltaic array, thereby efficiently charging the multitude of user devices over the plurality of lighting conditions.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

An architecture that implements the various features of the disclosed systems and methods will now be described with reference to the drawings. The drawings and the associated descriptions are provided to illustrate embodiments and not to limit the scope of the disclosure.

Throughout the drawings, reference numbers are re-used to indicate correspondence between referenced elements. In addition, the first digit of each reference number indicates the figure in which the element first appears.

DETAILED DESCRIPTION

The present invention relates to a method and an apparatus for charging a battery using solar energy or light. While the specification describes several example embodiments of the invention, it should be understood that the invention can be implemented in many ways and is not limited to the particular examples described below or to the particular manner in which any features of such examples are implemented. For example, although the invention may be described at times in the context of portable solar battery chargers, the invention can be applicable to other devices, such as solar chargeable replacement battery packages. An example of a solar chargeable replacement battery package is described in commonly-owned pending U.S. application Ser. No. 12/389,332, filed Feb. 19, 2009, and entitled "SOLAR CHARGEABLE BATERY FOR PORTABLE DEVICES," which is hereby incorporated by reference in its entirety.

Figure 1A:
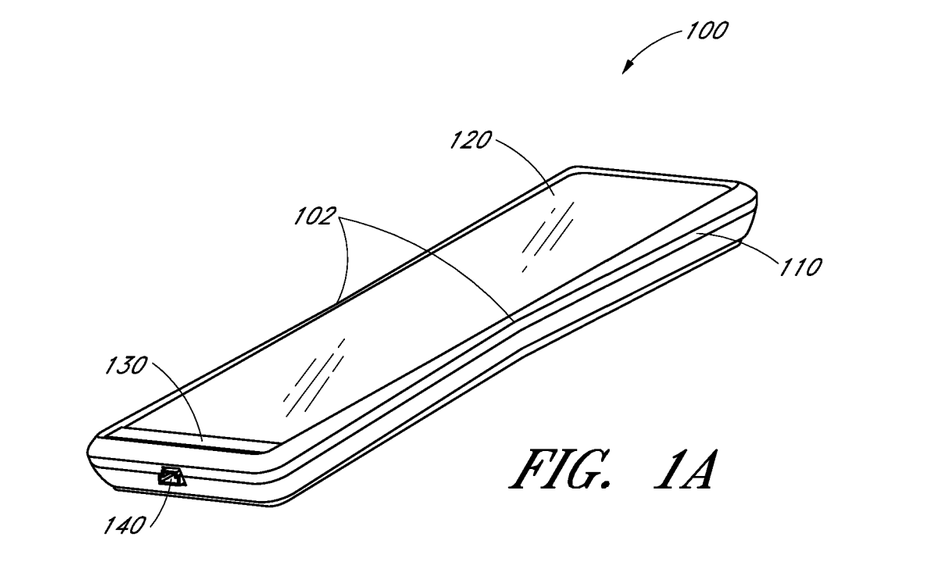
FIG. 1A is a perspective view of a portable solar battery charger in accordance with one embodiment.
Figure 1B:
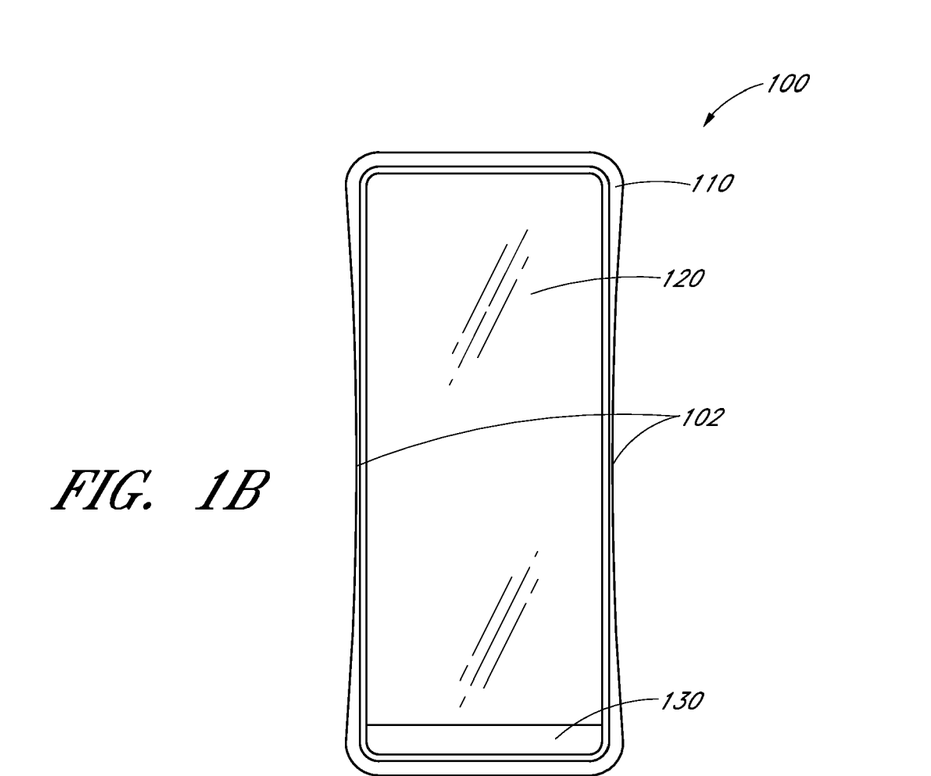
FIG. 1B is a top plan view of the portable solar battery charger of FIG. 1A.
Figure 2:
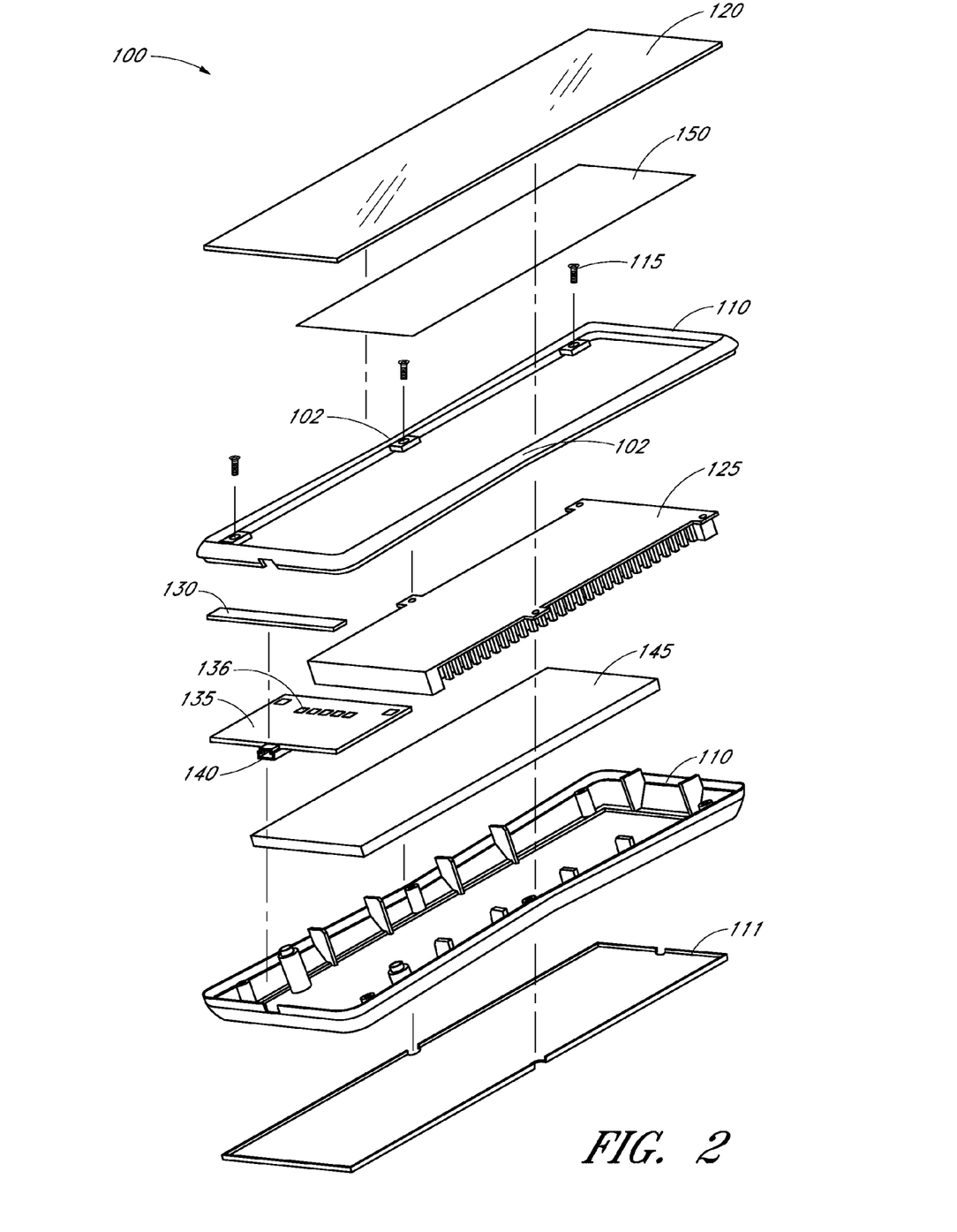
FIG. 2 is an exploded perspective view of the portable solar battery charger of FIG. 1A.

FIG. 1A is a perspective view of a portable solar battery charger 100 in accordance with one embodiment. FIG. 1B is a top plan view of the portable solar battery charger of FIG. 1A. FIG. 2 is an exploded perspective view of the portable solar battery charger 100 of FIG. 1A. The illustrated portable solar battery charger 100 comprises a housing 110, a photovoltaic (PV) array 120, a heat sink 125, a display 130, a printed circuit board 135 having an integrated circuit 136, an interface 140, a battery 145, and a redistribution layer 150.

As will be described in further detail below, the portable solar battery charger 100 can provide a power-efficient delivery of a charging current to the battery 145. The portable solar battery charger 100 can efficiently deliver a charging current to the battery 145 while avoiding the complexity of other power management charging algorithms, such as an algorithm using dithering, which can be impractical to implement, can require numerous external tracking signals, and can falsely lock on a non-efficient charging current. The portable solar battery charger 100 can be configured to allow the battery 145 to be charged efficiently as a user moves the portable solar battery charger 100 through a variety of lighting conditions, both natural and artificial. Thus, by improving the power efficiency associated with the charge current provided to the battery 145, the charge of the battery 145 can be increased quickly, allowing a user to charge the battery of a user device more rapidly. Furthermore, by configuring the interface 140 to be compatible with a variety of user-devices, such as by making the interface a standard interface and/or by providing one or more insertable tips or cables, the portable solar battery charger 100 can efficiently recharge the batteries of a vast array of portable user devices over a wide range of lighting conditions, without the need for access to a wall outlet.

The housing 110 of the portable solar battery charger 100 can have a variety of form factors and can comprise a variety of materials. For example, the housing 110 can have bends 102 to facilitate a user holding the portable solar battery charger 100. As skilled artisans will recognize, the housing 110 can comprise a variety of materials including plastics, metals, and/or rubbers, and can be configured to absorb shock if the portable solar battery charger 100 is dropped. As illustrated in FIG. 1, the housing 110 can house the PV array 120, and the upper face of the housing 110 can include an opening configured to allow light to reach the PV array 120. The housing 110 can also include a display 130, which can be configured to display information to a user, as will be described in further detail below with reference to FIGS. 3-4. The housing 110 can be secured to one or more components of the portable solar battery charger 100 using, for example, the screws 115. However, skilled artisans will recognize that a wide multitude of fasteners or connectors can be used to assemble the portable solar battery charger 100.

In one embodiment, the housing 110 includes first and second plastic body portions. The first body portion includes an opening configured to allow light to reach the PV array 120. The two body portions can be configured to be mateable along a parting plane running substantially parallel to the plane containing the mouth of the opening, and can be secured by screws or fasteners. The housing 110 can be attached to a base 111, which can comprise, for example, rubber, and can be secured to the second body portion and can be configured to prevent the portable solar battery charger 100 from slipping when placed on a low-friction surface, such as glass or polished wood. In one embodiment, after assembly the housing 110 has a length selected from the range of about 170 mm to about 180 mm, a width selected from the range of about 76 mm to about 84 mm, and a height selected from the range of about 15 mm to about 20 mm. The opening on the first body portion can have a width selected from the range of about 74 mm to about 82 mm, and the a length selected from the range of about 168 mm to about 178 mm.

With continuing reference to FIGS. 1-2, the illustrated portable solar battery charger 100 includes the PV array 120, which can be used to convert solar energy or light into electrical energy for charging a battery, as will be described in further detail below. In one embodiment, the PV array 120 is configured to absorb light beyond the band of visible light in the ultraviolet and infrared bands, thereby permitting use of the portable solar battery charger 100 over a wide range of lighting conditions, including indoor lighting conditions.

The portable solar battery charger 100 can include the heat sink 125 to protect heat-sensitive components from thermal energy emanating from the PV array 120. For example, the heat sink 125 can be configured to absorb heat emitted from the PV array 120 before the heat reaches the battery 145, thereby protecting the battery 145 from the dangers of heat-damage or explosion.

The portable solar battery charger 100 can include the printed circuit board 135, which can be configured to mechanically support and electrically connect one or more integrated circuits 136 or other electronic components. As will be described below in further detail, the printed circuit board 135 can aid in electrically connecting electronic circuits configured to control the charging of the battery 145, and/or for managing a wide variety of other functions of the portable solar battery charger 100, such as control of the display 130.

The redistribution layer 150 can be employed to facilitate connections between the printed circuit board 135 and the PV array 120, as well as to aid in connecting one section of the PV array 120 to another. For example, the redistribution layer 150 can be configured to be substantially the same size as the PV array 120, and the redistribution layer 150 can be bumped to the PV array 120 using a multitude of solder bumps. The redistribution layer 150 can include one or more layers of electrical conductors and insulators which can provide electrical connectivity between the PV array 120 and one or more electrical components external to the PV array 120, such as the printed circuit board 135.

The battery 145 can comprise, for example, a lithium based battery, such as a lithium-ion battery or a lithium-polymer battery. The battery can be charged using the energy generated from the PV array 120. Thereafter, accumulated charge in the battery 145 can be employed to charge the battery of a user device using the interface 140, which can comprise, for example, a USB interface, including, for example, micro-USB and mini-USB interfaces. The interface 140 can communicate with a user device using, for example, an insertable tip or cable configured to interface with a particular port on a device, including an input port configured to receive an AC adapter. The details of charging the battery 145 and the battery of a user device is described in further detail below with reference to FIGS. 3-8.

Although the portable solar battery charger 100 has been described as charging the battery 145, skilled artisans will appreciate that the battery 145 can be omitted, and that the portable solar battery charger 100 can directly charge a battery, including, for example, a battery removed from a user device. For example, the charger could directly charge a battery, as described in commonly-owned pending U.S. application Ser. No. 12/389,332, which was previously incorporated by reference in its entirety.

Figure 3:
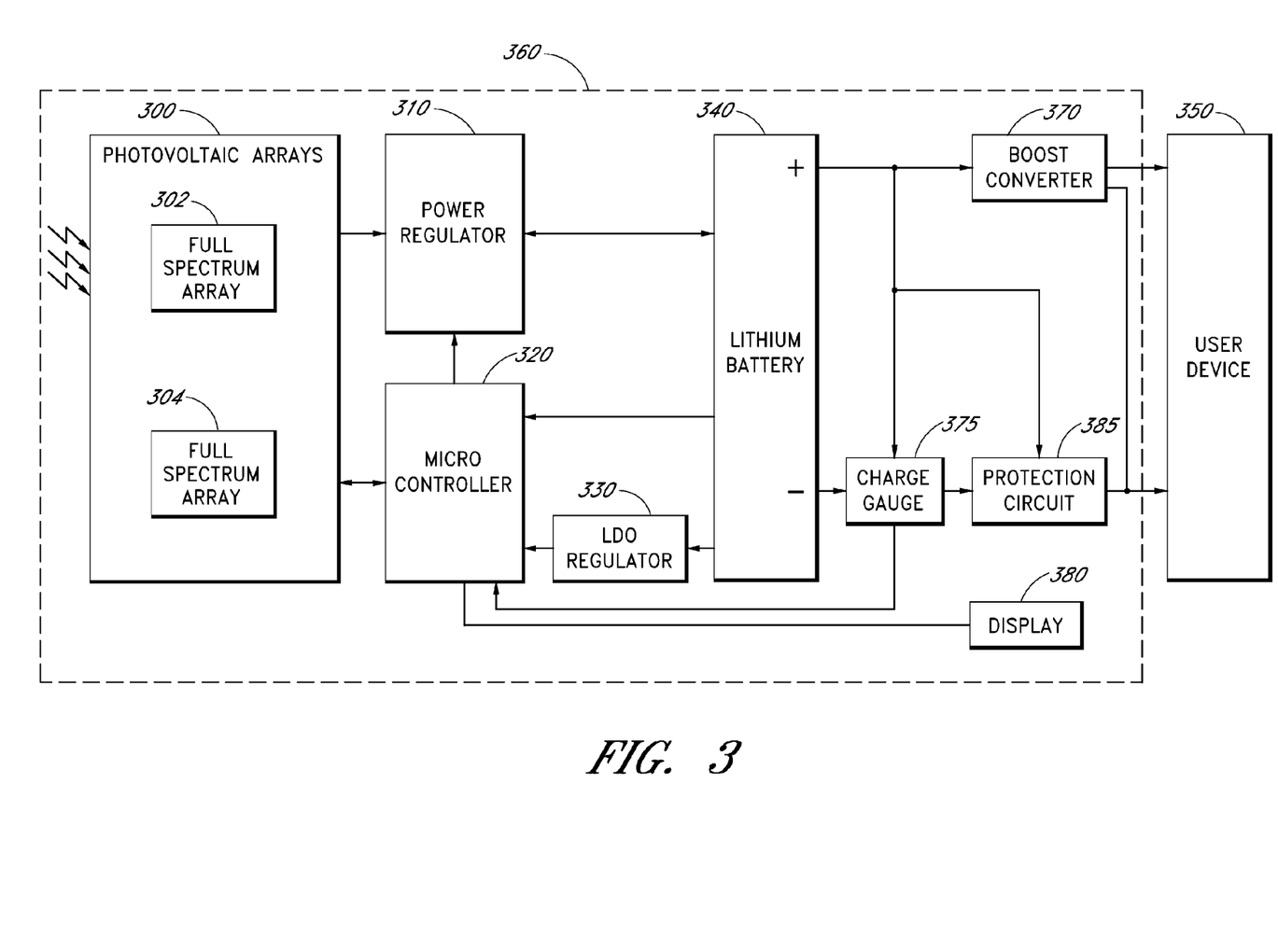
FIG. 3 is a block diagram of a portable solar battery charger in accordance with one embodiment.

FIG. 3 is a block diagram of a portable solar battery charger 360 in accordance with one embodiment. The illustrated portable solar battery charger 360 includes a PV array 300, a power regulator 310, a microcontroller 320, a low-dropout (LDO) regulator 330, a battery 340, a boost converter 370, a charge gauge 375, a display 380, and a protection circuit 385. The illustrated block diagram includes components which can, but need not, correspond to one or more of the components illustrated in FIGS. 1A-2. For example, the PV array 300 can correspond to the PV array 120, the display 380 can correspond to the display 130, and the battery 145 can correspond to the battery 340. Likewise, the power regulator 310, the microcontroller 320, the LDO regulator 330, the boost converter 370, the charge gauge 375, and the protection circuit 385 can correspond to one or more components of the printed circuit board 135, and the functionality of these blocks can be implemented in full or in-part by the integrated circuit 136. Furthermore, the illustrated connection between the boost converter 370 and the user device 350 can be made using the interface 140 shown in FIGS. 1-2.

As shown in FIG. 3, the PV array 300 can include one or more PV cells 302, 304. The PV array 300 can output a substantially DC power source at a voltage level and a current level that vary with lighting conditions. For example, the voltage and/or current provided by the PV array 300 can vary greatly depending upon the density and the wavelength of available light exposed to the PV cells 302, 304. The variation of voltage and/or current provided by the PV array 300 across changing light conditions will be described in further detail below with reference to FIGS. 5A-5C.

The PV cells 302, 304 of the PV array 300 can be single-junction PV cells, multi-junction PV cells, or a combination of both. Particular embodiments of multi-junction PV cells are discussed in further detail in commonly-owned pending U.S. application Ser. No. 12/389,307, filed Feb. 19, 2009, and entitled "PHOTOVOLTAIC MULTI-JUNCTION WAVELENGTH COMPENSATION SYSTEM AND METHOD," which is hereby incorporated by reference in its entirety.

In one embodiment, the battery 340 is a lithium based battery, such as a lithium-ion battery or a lithium-polymer battery. The battery 340 may provide one or more signals to various blocks, such as the microcontroller 320. For example, the battery 340 can be configured to provide the microcontroller one or more signals indicative of battery temperature. In one embodiment, the battery 340 provides power to one or more blocks within the portable solar battery charger 360.

In one embodiment, a low drop-out (LDO) regulator 330 can also be electrically coupled to the battery 140 to aid the battery in providing power to one or more blocks of the portable solar battery charger 360. For example, the LDO regulator 320 can be configured to provide the microcontroller 330 a substantially constant voltage, e.g., about 1.8V, despite variation in the voltage level of the battery 340.

In one embodiment, the illustrated portable solar battery charger 360 includes the power regulator 310 and the microcontroller 320, which can be configured to efficiently charge the battery 340 from the variable voltage/current DC power source provided by the PV array 300. The power regulator 310 can receive a substantially DC power source from the PV array 300 at an input terminal and provide a charging current to the battery 340 at an output terminal. The power regulator 310 can be configured to receive feedback signals from the battery 340 for voltage and/or current regulation. In one embodiment, the microcontroller 330 is configured to charge a lithium battery using one or more constant current (CC) phases followed by one or more constant voltage (CV) phases, as will be described in further detail below with reference to FIG. 7.

In one embodiment, the microcontroller 320 provides one or more control signals to the power regulator 310. For example, as will be described in further detail below, the microcontroller may control the level (amplitude) of the charging current provided by the power regulator 310 to the battery 340 in order to improve power efficiency. Additionally, the microcontroller can be configured to selectively adjust a regulated voltage level at the output terminal of the power regulator 310 in response to voltage variations of the substantially DC power source, as described in U.S. application Ser. No. 12/389,332, which was incorporated by reference in its entirety above. The microcontroller can be configured to monitor the power source from the PV array 300 to improve the operation of the portable solar battery charger 360. For example, the microcontroller 320 may monitor the PV array 300 and also provide control signals to the PV array 300 to improve PV cell efficiency as described in U.S. application Ser. No. 12/389,307, which was incorporated by reference in its entirety above.

In one embodiment, the microcontroller 320 configures the power regulator 310 to operate in different modes to efficiently charge the battery 340 under varying lighting conditions. The power regulator 310 can be configured to provide a charging current that is efficient from a power efficiency standpoint for the lighting conditions at a given time, and can be configured to periodically recalibrate the charging current to an efficient value over time. In one embodiment, to be described in further detail below, the microcontroller 320 can be configured to recalibrate the charging current by increasing the charging current provided by the power regulator 310 in discrete steps until the voltage provided by the PV array 300 falls below a threshold voltage. Thereafter, the microcontroller 320 can step the current back one or more steps to achieve a power-efficient setting of the charge current, as will be described in further detail below.

The user device 350 can be a variety of devices, including, but not limited to, a laptop computer, camera, cell phone, PDA, GPS unit, music player device, or hand-held device. The portable solar battery charger 360 can include the boost converter 370 to aid in interfacing with the user device 350. The boost converter 370 can be configured to provide a substantially constant voltage to the user device 350, such as about 5V, allowing the user device 350 to interface with the portable solar battery charger 360 using a standard interface, e.g., a USB interface. Thus, even if the battery 340 is only partially charged or has a maximum voltage below that of a desired output voltage level, the boost converter 370 can be employed to provide the user device 350 with the desired output voltage. Accordingly, the portable solar battery charger 360 can be configured to interface with a vast multitude of user devices 350. In one embodiment, the portable solar battery charger 360 interfaces with the user device 350 using an insertable tip or cable. For example, an insertable tip can be provided which interfaces with a particular port on a device, including an input port configured to receive an AC adapter.

In one embodiment, the portable solar battery charger 360 includes the protection circuit 385. Some batteries, including a variety of lithium based batteries, can rupture, ignite, or explode under certain conditions, such as when the battery is provided with a large shorting current. The protection circuit 385 can be provided to control the flow of current into, or out of, the battery 340. In one embodiment, the protection circuit 385 inhibits a current exceeding a threshold value from flowing to or from the battery 340.

In one embodiment, the portable solar battery charger 360 includes the charge gauge 375 and the display 380. The charge gauge 375 can be configured to measure the charge level on the battery 340, such as by monitoring the voltage between the positive and negative terminals and/or the charge into or out of a terminal of the battery, and provide one or more signals indicative of charge level to the microcontroller 320 and/or directly to the display 380. Furthermore, the microcontroller 310 can provide one or more signals to the display 380, including signals indicative of the charge level of the battery 340. Thus, the portable solar battery charger 360 can be configured to use the display 380 to provide the user with a variety of information including the level of charge in the battery 340. In one embodiment, the microcontroller 320 provides a signal indicative of the amplitude and/or presence of the charge current provided to the battery 340 from the power regulator 310. The, display 380 can include, for example, one or more light emitting diodes (LEDs) or other display elements. For example, the display could include a multitude of individual LEDs, wherein the number of LEDs illuminated can be indicative of the level of charge on the battery 340. However, skilled artisans will recognize that a wide multitude of displays exist which could be used for the display 380, including, for example, alpha-numeric displays. In another embodiment, the display 380 includes a position indicator, such as, for example, a position indicator LED, which is configured to indicate the current provided from the PV array 300 to the power regulator 310. For example the LED may be set up to be brighter when the lighting conditions are bright and dimmer when the lighting conditions are not so bright. The lighting conditions may for example be determined by measuring the amplitude of the current received from the PV array 300 by the power regulator 310. Thus, the user can be provided with information indicative of lighting conditions.

In one embodiment, the portable solar battery charger 360 is configured to charge the battery 340 using power from an exterior source, using, for example, a standard user interface, such as a USB interface. The USB interface can generate power using a wall outlet or a laptop. Thus, the battery 345 of the portable solar battery charger 300 can begin at a high charge level, thereby facilitating the recharge of the batteries of one or more user devices while the user is on the go. In one embodiment, the power regulator 310 is further configured to receive power from an interface (e.g., 140).

Figure 4:
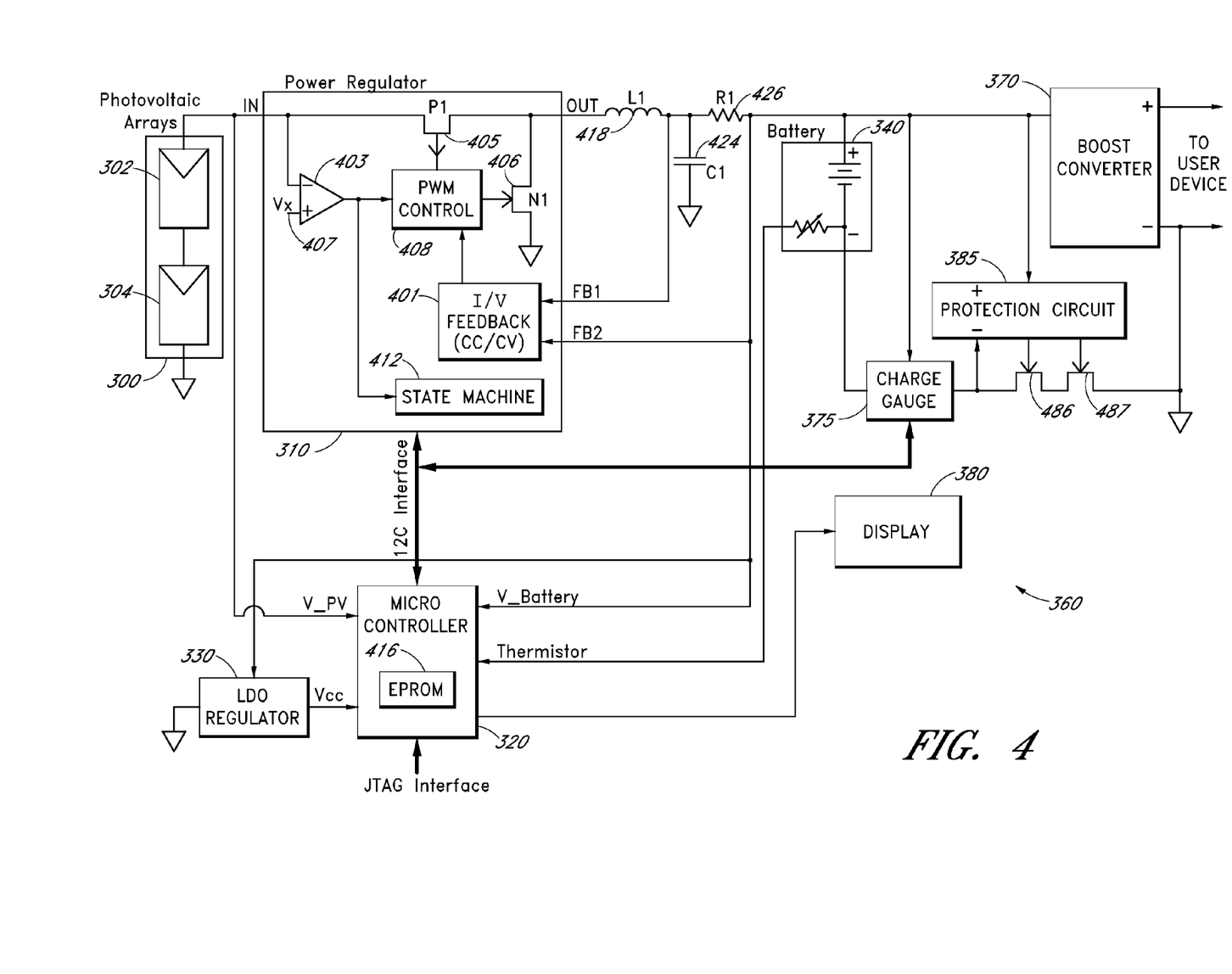
FIG. 4 is a circuit diagram for one implementation of the portable solar battery charger of FIG. 3.

FIG. 4 is a circuit diagram for one implementation of the portable solar battery charger 360 of FIG. 3. The illustrated portable solar battery charger includes a PV array 300, a power regulator 310, a microcontroller 320, a low-dropout (LDO) regulator 330, a battery 340, a boost converter 370, a charge gauge 375, a display 380, and a protection circuit 385.

The illustrated PV array 300 includes two PV cells 302, 304. The PV cells 302, 304 can be single junction and/or multi-junction, or can be of a multitude of types, as was described in detail above with reference to FIG. 3. Although the PV array 300 is illustrated as having two PV cells 302, 304 connected in series, persons of ordinary skill in the art will recognize that the PV array 300 can include additional PV cells, and that the PV cells can be arranged in a wide multitude of configurations. In one embodiment, the PV array 300 is configured to have an operating voltage selected from the range of about 3.55V to 6.0V, or more particularly about 4.55V to 4.7V, when drawing a current from the PV array of about 350 mA at a temperature of about 50° C., and when the PV array 300 is exposed to a solar concentration of about 1 Sun. As skilled artisans will recognize, less or more PV cells can be employed to generate a power source having a different operating voltage under the same conditions.

With continuing reference to FIG. 4, the illustrated portable solar battery charger 360 includes the microcontroller 320. The microcontroller 320 can be configured to monitor a variety of parameters of the portable solar battery charger 360 and to control the operation of the power regulator 310, as will be described in further detail below. In one embodiment, the microcontroller 320 includes a standard interface (e.g., $I^2C$ interface) for defining parameters such as, but not limited to, battery temperature range, battery regulation voltages, charging current levels, charging termination thresholds, and other parameters which may be used in controlling the operation of the portable solar battery charger 360. Additionally, the standard interface can be utilized to provide code, such as machine code, to the microcontroller 320. In one embodiment, the microcontroller 320 parameters and control code are stored in a non-volatile memory, for example, a flash memory such as EPROM 416. The microcontroller 320 can be implemented in many ways, and can be, for example, a stand-alone chip, an integrated circuit enclosed in a shared package (system on a package), or a component of a larger chip (system on a chip). In one embodiment, the microcontroller 320 is selected from the Texas Instruments MSP430 family of microcontrollers, and can comprise, for example, the MSP430F2112 part.

In one embodiment, the power regulator 310 is a switching regulator (or synchronous buck converter) implemented with on-chip switching transistors (e.g., field-effect-transistors P1 and N1) 405, 406 and an off-chip inductor (L1) 418 coupled to an output terminal (OUT) of the power regulator 310. An output sensing resistor 426 can be coupled in series with the inductor 418 to a positive terminal of the battery 340. In one embodiment, an output capacitor (C1) 424 is coupled between a voltage reference, such as ground, and a common node connecting the inductor 418 and the output sensing resistor 426.

The power regulator 310 can include a pulse-width-modulation (PWM) circuit 408 and a feedback circuit 401. The feedback circuit 401 can be configured to receive one or more feedback signals (e.g., FB1 and FB2) indicative of, for example, a charge current provided to the battery 340 and/or a voltage at a terminal of the battery 340. The feedback circuit 401 can output one or more control signals to the PWM circuit 408, which can generate driving or control signals for the switching transistors 405, 406 to regulate the charge current and/or the battery voltage. The feedback circuit 401 can be programmed to run different charging algorithms (e.g., CC/CV or chemical polarization) with programmable charge current profiles and voltage regulation levels. For example, the battery 340 can be selected to be a lithium based battery and the voltage regulation level can be selected to be about 4.2V. In one embodiment, the power regulator 310 is selected from the Texas Instruments BQ2415x family of chargers, and can comprise, for example, the BQ24150 part.

In one embodiment, the power regulator 310 further includes a state machine 412 configured to selectively operate the power regulator 310 in different modes. For example, the microcontroller 320 can be configured to provide one or more control signals/commands to the power regulator 310 to control the operating modes and parameters. The control signals/commands may be communicated to the power regulator 310 directly via dedicated pins or through a standard interface such as an $I^2C$ interface. The control signals/commands can include a sequence of charging currents and/or a current step size, as will be described in further detail below with reference to FIGS. 6A-8. The state machine 412 can also include information indicative of the state of the power regulator 310. In one embodiment, the state machine can be accessed by another block, such as the microcontroller 320, using an interface, such as an $I^2C$ interface. The microcontroller 320 can be configured to process the state of the power regulator 310 and select subsequent control signals/commands to the power regulator 310 based on the state.

The power regulator 310 can include a comparator 403, which can be configured to compare one or more parameters and to generate one or more comparison signals. For example, the comparator 403 can be configured to compare the operating voltage of the PV array to a threshold voltage. As illustrated in FIG. 4, the comparator 403 can be configured to generator a comparison signal indicative of whether or not the operating voltage of the PV array is below a voltage reference Vx. The comparison signal can be used to aid in controlling the power regulator 310, as will be described in further details below. Persons of ordinary skill in the art will recognize that there are numerous ways to indirectly compare the operating voltage of the PV array to Vx, without directly comparing the two voltage values. For example, the comparator 403 can be configured to make this comparison using a current indicative of the operating voltage of the PV array or Vx, or using a voltage across a device, such as a resistor, which has a calculable relationship to the voltage value desired to be compared.

In one embodiment, the threshold voltage is hard-wired into the power regulator 310, and can be selected to be about 3.55V. In another embodiment, the threshold voltage is determined by one or more programmable values, such as a value provided by the microcontroller 320, and can be selected to be in the range of about 3.30V-3.80V. The programmable threshold voltage can be provided to the state machine 412 of the power regulator 310 by the microcontroller 320 via dedicated pins or through a standard interface such as an $I^2C$ interface.

In one embodiment, the comparator 403 is configured to provide the comparison signal to the microcontroller 320. As skilled artisans will recognize, the comparison signal can be provided to the microcontroller 320 in a variety of ways. For example, as illustrated in FIG. 4, the comparison signal can be provided to the state machine 412, which can be accessed by the microcontroller 320 using an interface, such as an I$^2$C interface. The comparison signal can also be provided to the microcontroller 320 or other block using a direct connection, including one or more dedicated pins. Although the comparator 403 is illustrated as being part of the power regulator 310, the comparator and the power regulator 310 need not necessarily be in close physical proximity. For example, the functionality of the comparator 403 can be implemented on the microcontroller 320, and the power regulator 310 and the microcontroller 320 can be separate chips.

The comparator 403 can also be configured to provide the comparison signal to one or more portions of the power regulator 310, such as, for example, the PWM circuit 408. In one embodiment, the PWM circuit 408 is configured to substantially decrease the charging current provided to the battery 340 if the comparison signal indicates the PV array voltage is below a threshold. For example, the PWM circuit 408 can be configured to decrease the charging current to, for example, substantially 0 mA if the comparison signal indicates the PV array voltage is below Vx, even if the microcontroller 320 has provided a non-zero current charging command to the power regulator 310. Control of the charging current is described in further detail below, with reference to FIGS. 6A-8.

The battery 340 can be a lithium based battery, such as a lithium-ion battery or a lithium-polymer battery, as was described above with reference to FIG. 3. The battery 340 can provide one or more signals to other blocks, such as the microcontroller 320. For example, as illustrated in FIG. 4, the battery 340 can provide the microcontroller 320 one or more signals, e.g., a signal indicative of battery temperature (Thermistor) or battery voltage (V_Battery). The microcontroller 320 can be configured to monitor these parameters as well as additional parameters that can affect charging operations. For example, the microcontroller 320 can be configured to sample the battery temperature and terminate charging operations if the battery temperature is outside a programmable temperature range (e.g., about 0° C.-40° C.) deemed unsafe for charging. In one embodiment, the microcontroller 320 is configured to monitor the positive terminal of the battery 140 to perform battery chemistry analysis. In another embodiment, the microcontroller 320 is implemented by digital circuits and includes one or more analog-to-digital converters (ADCs) to convert analog samples of the various parameters (e.g., V_Battery, Thermistor) into digital signals for further processing.

In one embodiment, the battery 340 provides power to one or more blocks within the portable solar battery charger 360. The battery 340 can provide power directly to the blocks, or indirectly through a regulator, such as the LDO regulator 330. For example, the LDO regulator 330 can be configured to generate a power source (Vcc) at an appropriate level for one or more blocks of the portable solar battery charger 360, such as the microcontroller 320. In one embodiment, the LDO regulator 330 is configured to provide the microcontroller 320 a substantially constant voltage of about 1.8V, despite variation in the voltage level of the battery 340. The microcontroller 320 can be configured to enter a quiescent or sleep mode when the PV array operating voltage (V_PV) is below a certain level in order to prevent draining of the battery 340 via the LDO regulator 330. In one embodiment, the microcontroller 320 continues to monitor the PV array 300 during the sleep mode but other functions are turned off to reduce power consumption. The LDO regulator 330 can, but need not, be selected from the Texas Instruments TPS728 family of LDO regulators, and can comprise, for example, the TPS728185315 part.

With continuing reference to FIG. 4, the illustrated portable solar battery charger 360 includes the boost converter 370 to aid in interfacing with a user device. The boost converter 370 can be configured to boost the battery voltage to a substantially constant voltage, thereby allowing the portable solar battery charger 360 to interface with a user device over a standard interface, e.g., a USB interface. For example, a USB interface can operate at about 5V, and the boost converter 370 can be configured to boost the voltage from the battery 340 to about 5V. Thus, even if the battery 340 is only partially charged or has a maximum voltage below that of a desired voltage level, the boost converter 370 can provide the user device 350 with the desired voltage. Accordingly, the portable solar battery charger 360 can be configured to interface with a vast multitude of user devices, which can include, for example, a laptop computer, camera, cell phone, PDA, GPS unit, music player device, or hand-held device. In one embodiment, the portable solar battery charger 360 interfaces with the user device using an insertable tip or cable. For example, an insertable tip can be provided which interfaces with a particular port on a device, including a port configured to receive an AC adapter. In one embodiment, the boost converter 370 is selected from the Texas Instruments TPS6103x family of boost converters, and can comprise, for example, the TPS61032 part.

In one embodiment, the portable solar battery charger 360 includes the protection circuit 385. Some batteries, including a variety of lithium based batteries, can rupture, ignite, or explode under certain conditions, such as when the battery is provided with a relatively large shorting current. The protection circuit 385 can be provided to control the flow of current into, or out of the battery 340. In one embodiment, the protection circuit 385 monitors the voltage across the battery 340 and/or into the negative terminal of the battery and inhibits a current exceeding a threshold value from flowing into or out of the negative terminal. This can be accomplished, for example, by generating control signals for the switching transistors 486, 487. The boost converter 370 can, but need not, be selected from the Seiko S-8211C series of battery protection circuits, and can comprise, for example, the S-8211CAT-M5T1G part.

In one embodiment, the portable solar battery charger 360 includes the charge gauge 375 and the display 380. The charge gauge 375 can be configured to measure the charge level on the battery 340 and provide one or more signals indicative of charge level to the microcontroller 320 and/or directly to the display 380. For example, the charge gauge 375 can communicate with the microcontroller 320, via dedicated pins or using an interface, such as an I$^2$C interface. In one embodiment, the charge gauge 375 is selected from the Texas Instruments BQ275xx series of fuel gauges, and can comprise, for example, the BQ27541 part.

The, display 380 can include, for example, one or more light emitting diodes (LEDs) or other display elements. The microcontroller can be configured to communicate with the display 380. Thus, the portable solar battery charger 360 can be configured to use the display 380 to provide the user with a variety of information including the level of charge on the battery 340. Additionally, the microcontroller 320 can provide one or more signals to the display 380. For example, the microcontroller 320 can provide a signal indicative of the amplitude and/or presence of the charge current provided to the battery 340 from the power regulator 310. In another embodiment, the display 380 includes a position indicator, such as, for example, a position indicator LED, which is configured to indicate the current (by an change in brightness of the LED) provided from the PV array 300 to the power regulator 310. Thus, the portable solar battery charger 360 can be configured to provide useful information to a user of the charger, such as charging status, charging magnitude, and light intensity.

Figure 5A:
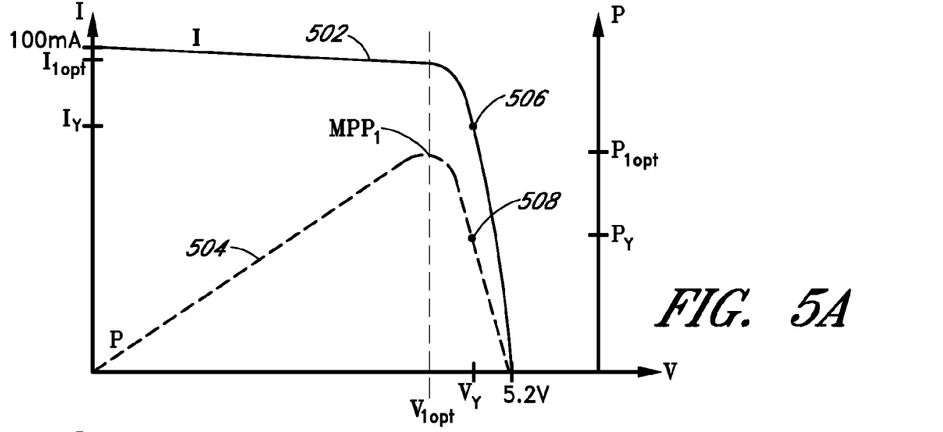
FIG. 5A illustrates current-voltage (I-V) and power-voltage (P-V) curves of a photovoltaic array in accordance with one embodiment.
Figure 5B:
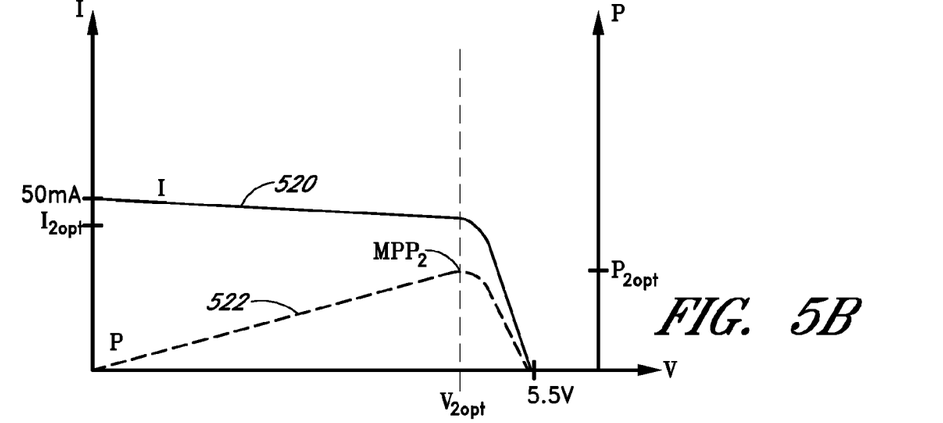
FIG. 5B illustrates I-V and P-V curves of a photovoltaic array in accordance with another embodiment.
Figure 5C:
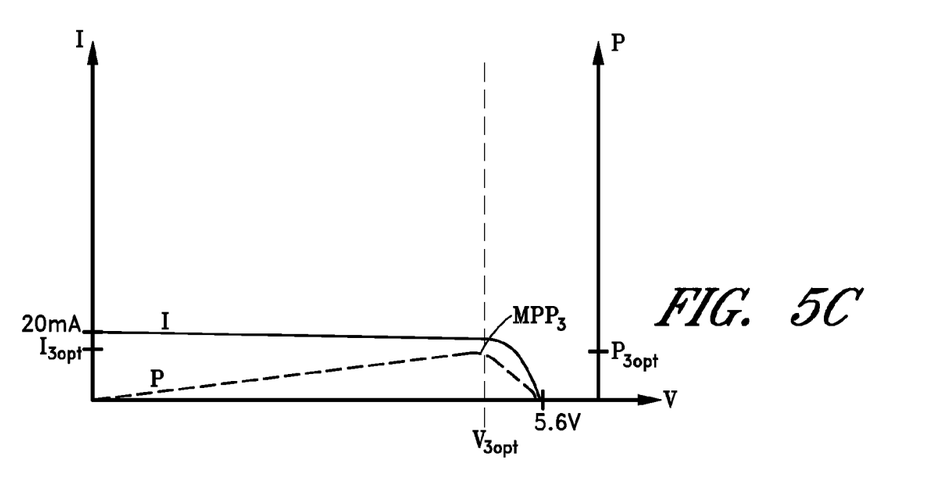
FIG. 5C illustrates I-V and P-V curves of a photovoltaic array in accordance with yet another embodiment.

FIGS. 5A-5C illustrate exemplary I-V and P-V curves of a photovoltaic array, such as the PV array 300 of FIG. 4, when exposed to varying light conditions. For example, FIGS. 5A, 5B, and 5C can correspond to the I-V and P-V curves of a photovoltaic array when exposed to direct sunlight, light received in the backseat of a car, and light received indoors, respectively. As skilled artisans will recognize, a PV array can have an I-V curve resembling a current source in parallel with a diode. As light intensity increases, the current generated by the one or more PV cells of the PV array can increase, thereby shifting the I-V curve upwards.

A given I-V curve has a corresponding P-V curve which can be determined by multiplying the voltage by the current at each voltage point. Thus, with reference to FIG. 5A, a first I-V curve 502 corresponds to a first P-V curve 504. Similarly, with reference to FIGS. 5B and 5C, a second I-V curve 520 corresponds to a second P-V curve 522, and a third I-V curve 540 corresponds to a third P-V curve 542. As can be send in FIGS. 5A-5C, the P-V curves 504, 522, and 542 each exhibit a power maxima or maximum power point, denoted by $MPP_1$, $MPP_2$, and $MPP_3$, respectively. It can be desirable from a power efficiency standpoint for a charger, such as the portable solar battery charger 360, to efficiently recharge a battery over a wide range of lighting conditions. Thus, it can be desirable for a charger to operate close to the maximum power point.

Depending on the amount of current drawn from the PV array by an external source (e.g., the power regulator 310), the PV array can be biased at a variety of operating points. For example, when under the lighting conditions corresponding to the I-V and P-V curves illustrated in FIG. 5A, the PV array (e.g., 300) can be biased at a current and voltage corresponding to the point 506, or equivalently, a power and voltage corresponding to the point 508. Thus, if an external source (e.g., 310) were to draw a current $I_Y$ from the PV array, the operating voltage of the PV array can be $V_Y$ and the operating power of the PV array can by $P_Y$. Although the external source (e.g., 310) can draw a current $I_Y$ from the PV array, this current draw corresponds to a power $P_Y$ below the maximum power $P_{1opt}$. Thus, it can be preferable to draw a current from the PV array nearer to the optimal current $I_{1opt}$. However, with reference to FIGS. 5A-5C, as lighting conditions change, the optimal current draw from the PV array can vary substantially, as can be seen graphically by the optimal current draws $I_{1opt}$, $I_{2opt}$, and $I_{3opt}$, respectively.

In one embodiment, the portable solar battery charger 360 is configured to efficiently recharge a battery over a wide range of lighting conditions. As will be described below with reference to FIGS. 6A-8, the microcontroller 320 can be configured to control the power regulator 310 so as to provide a power-efficient charging current to the battery 340, even when the microcontroller 320 may not have knowledge of the lighting conditions of the PV array, and therefore the I-V curve of the PV array, when selecting the charging current.

Figure 6A:
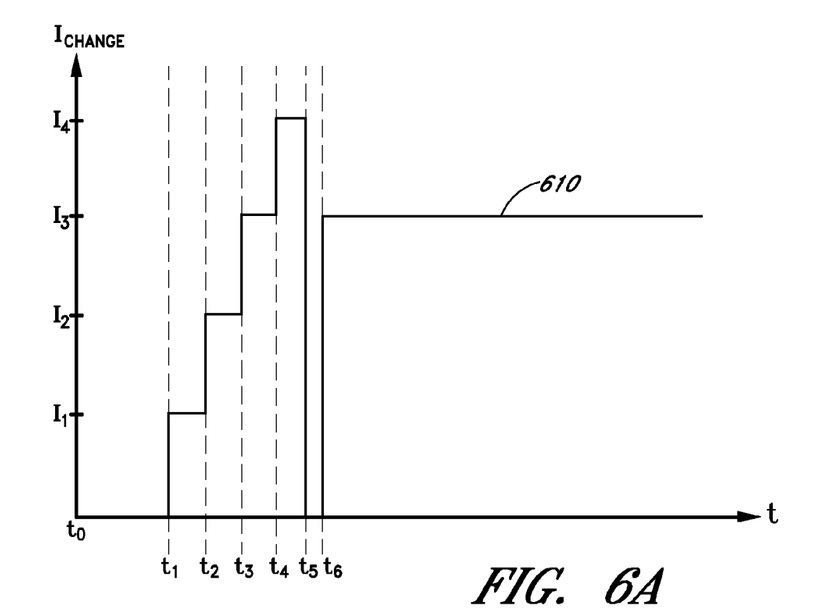
FIG. 6A illustrates an exemplary charging current as a function of time in accordance with one embodiment.

FIG. 6A illustrates charging current as a function of time in accordance with one embodiment. The illustrated charging current 610 can correspond to the charging current provided by the power regulator 310 to the battery 340 in the portable solar battery charger 360. As described above with reference to FIG. 4, the feedback circuit 401 of the power regulator 310 can be programmed to run different charging algorithms (e.g., CC/CV or chemical polarization) with programmable charge current profiles and voltage regulation levels. The power regulator 310 can further include the state machine 412 configured to selectively operate the power regulator 310 in different modes. In one embodiment, the microcontroller 320 can be configured to provide one or more control signals/commands to the power regulator 310 to control the regulator's operating modes and parameters. The control signals/commands can include a sequence of charging currents and/or a current step size, as will be described below.

With continuing reference to FIGS. 4 and 6A, the charging current can, but need not, be configured to begin at a current substantially equal to 0 mA. At a time $t_1$ the microcontroller 320 directs the power regulator 310 to provide a charging current having a value of about $I_1$ to the battery 340. Time $t_1$ can correspond to the initiation of a CC phase of a charging cycle, as will be described in further detail below with reference to FIG. 7. The microcontroller 320 can be configured to initiate battery charging under a variety of conditions. For example, the microcontroller 320 can direct the power regulator 310 to provide a charging current when the voltage level of the battery 340 falls below a battery recharge threshold. In one embodiment, the recharge threshold is selected to between about 50 mV to 200 mV, or more particularly about 100 mV to 150 mV, below the desired charged battery voltage. Thus, in an embodiment where the portable solar battery charger 360 is configured to charge the battery 340 to a voltage of about 4.2V, the microcontroller 320 can initiate a charging current when the voltage level of the battery 340 falls below a voltage threshold selected from the range of about 4.0V to 4.15V, or more particularly about 4.05V to 4.10V.

Figure 6B:
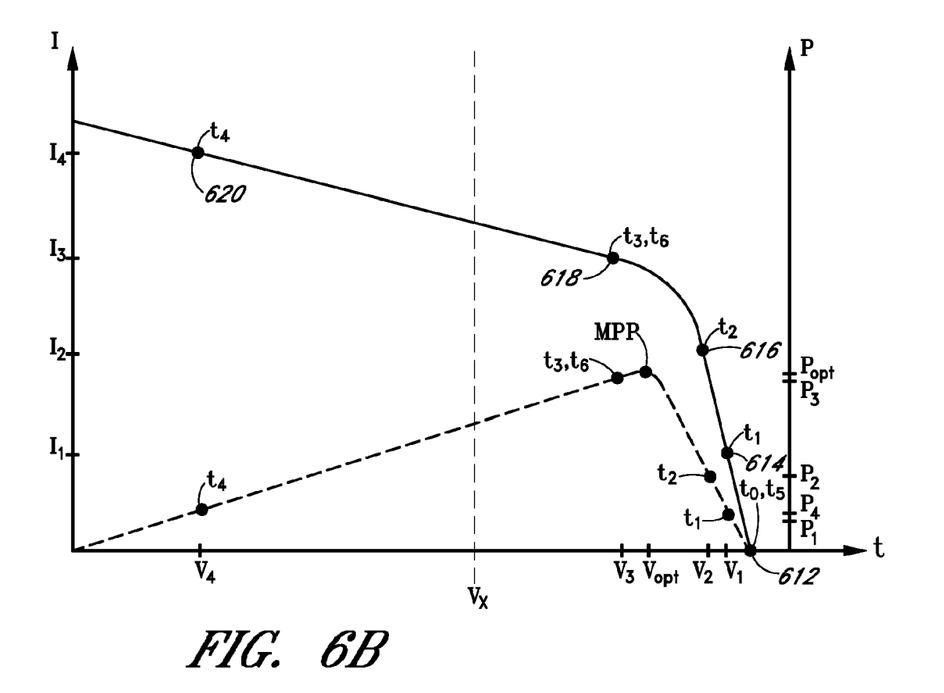
FIG. 6B illustrates photovoltaic array I-V and P-V biasing in accordance with one embodiment.

The charging current provided by the power regulator 310 can be provided by the PV array 300. Thus, with reference to FIG. 6B, drawing a charging current having a value of about $I_1$ can shift the I-V biasing point of the PV array 300 from a first biasing point 612 to a second biasing point 614. As illustrated in FIG. 6B, the second biasing point 614 corresponds to a biasing voltage $V_1$ and associated power $P_1$, which is below the optimum $V_{opt}$ and $P_{opt}$, respectively. Thus, at this point in time, the charging current 610 is not at an optimal power-efficiency setting.

At a time $t_2$, the microcontroller 320 can direct the power regulator 310 to provide a charging current having a value of about $I_2$ to the battery 340. In one embodiment, the current $I_2$ is equal to about a current value provided by the microcontroller 320, such as a value contained in the state machine 412. In another embodiment, the current $I_2$ is equal to about $I_1$ plus a current step size stored in the microcontroller 310. Drawing a charging current having a value of about $I_2$ can shift the I-V biasing point of the PV array 300 from the second biasing point 614 to a third biasing point 616. As illustrated in FIG. 6B, the third biasing point 616 corresponds to a biasing voltage $V_2$ and associated power $P_2$, which is below the optimum $V_{opt}$ and $P_{opt}$, respectively. Thus, at this point in time, the charging current 610 is still not at an optimal power-efficiency setting. In one embodiment, the difference between time $t_1$ and time $t_2$ is selected to be in the range of about 50 ms to 200 ms.

At a time $t_3$, the microcontroller 320 can direct the power regulator 310 to provide a charging current having a value of about $I_3$ to the battery 340. The value of the current $I_3$ can be selected to be a variety of values, including a value stored in the state machine 412 or an integer multiple of the current $I_1$.

Drawing a charging current having a value of about $I_3$ can shift the I-V biasing point of the PV array 300 from the third biasing point 616 to a fourth biasing point 618. As illustrated in FIG. 6B, the fourth biasing point 618 corresponds to a biasing voltage $V_3$ and associated power $P_3$, which is near the optimum $V_{opt}$ and $P_{opt}$, respectively. Thus, at this point in time, the charging current 610 is near an optimal power-efficiency setting.

With continuing reference to FIGS. 4 and 6A-6B, at a time $t_4$, the microcontroller 320 can direct the power regulator 310 to provide a charging current having a value of about $I_4$ to the battery 340. The value of the current $I_4$ can be selected to be a variety of values, as described above. Drawing a charging current having a value of about $I_4$ can shift the I-V biasing point of the PV array 300 from the fourth biasing point 618 to a fifth biasing point 620. As illustrated in FIG. 6B, the fifth biasing point 620 corresponds to a biasing voltage $V_4$ and associated power $P_4$, which, from a power efficiency standpoint, is not the optimum $V_{opt}$ and $P_{opt}$, respectively.

As described above with reference to FIG. 4, the portable solar battery charger 360 can include a comparator 403 configured to compare the operating voltage of the PV array 300 to a threshold voltage Vx. As shown in FIG. 6B, drawing a charging current having a value of about $I_4$ can shift the voltage biasing point of the PV array 300 from a voltage $V_3$ to a voltage $V_4$, thereby crossing the threshold voltage denoted Vx. In one embodiment, crossing the voltage Vx causes the comparator 403 to generate a comparison signal indicative of the crossing, which is received by the PWM circuit 408. The PWM circuit 408 can be configured to reduce or disable the charging current when the comparison signal indicates that the operating voltage of the PV array 300 is less than the threshold voltage Vx. This is illustrated in FIG. 6B by the charging current decreasing to substantially 0 mA at a time $t_5$.

The comparison signal can be provided directly to the microcontroller 320 in a variety of ways, as described above with reference to FIG. 4. Upon detecting a comparison signal indicating that operating voltage of the PV array 300 is less than the threshold voltage Vx, the microcontroller 320 can step the biasing point back one or more steps. In one embodiment, the microcontroller 320 can step the biasing point back by one step, such as, for example, from the fifth biasing point 620 to the fourth biasing point 618. In another embodiment, the microcontroller 320 can step the biasing point back by N number of steps, where N is selected to greater than one. Stepping the biasing point back a multiple steps can be beneficial in certain circumstances, such as when the difference between the current charging levels is selected to be relatively small. In one embodiment, the photovoltaic array I-V curve is measured after manufacturing under a variety of lighting conditions, and the microcontroller 320 is programmed to select current charging levels and number of steps to step back based at least partly on these measurements.

In one embodiment, the current charging levels (e.g., $I_1$, $I_2$, $I_3$, etc.) selected by the microcontroller 320 are determined by the slope of the I-V curve at a particular voltage, such as a voltage about halfway between about Vopt and 0V. The I-V curve of a photovoltaic array can have a region which is approximately linear, such as the region between about 0V and about Vopt. In one embodiment, the microcontroller 320 is programmed to select current charging levels and number of steps to step back using the slope at a voltage in the linear region.

At a time $t_6$, the current is stepped back to the selected current level. As illustrated in FIG. 6A, the difference in time between each event illustrated need not be the same. Rather, the difference between $t_1$ and $t_2$, $t_2$, and $t_3$, etc. can be selected to be a wide multitude of values. In one embodiment, the difference between time $t_4$ and time $t_5$ is selected to be in the range of about 50 ms to 200 ms, and the difference between time $t_5$ and time $t_6$ is selected to be between about 1 ms and 10 ms.

Figure 7:
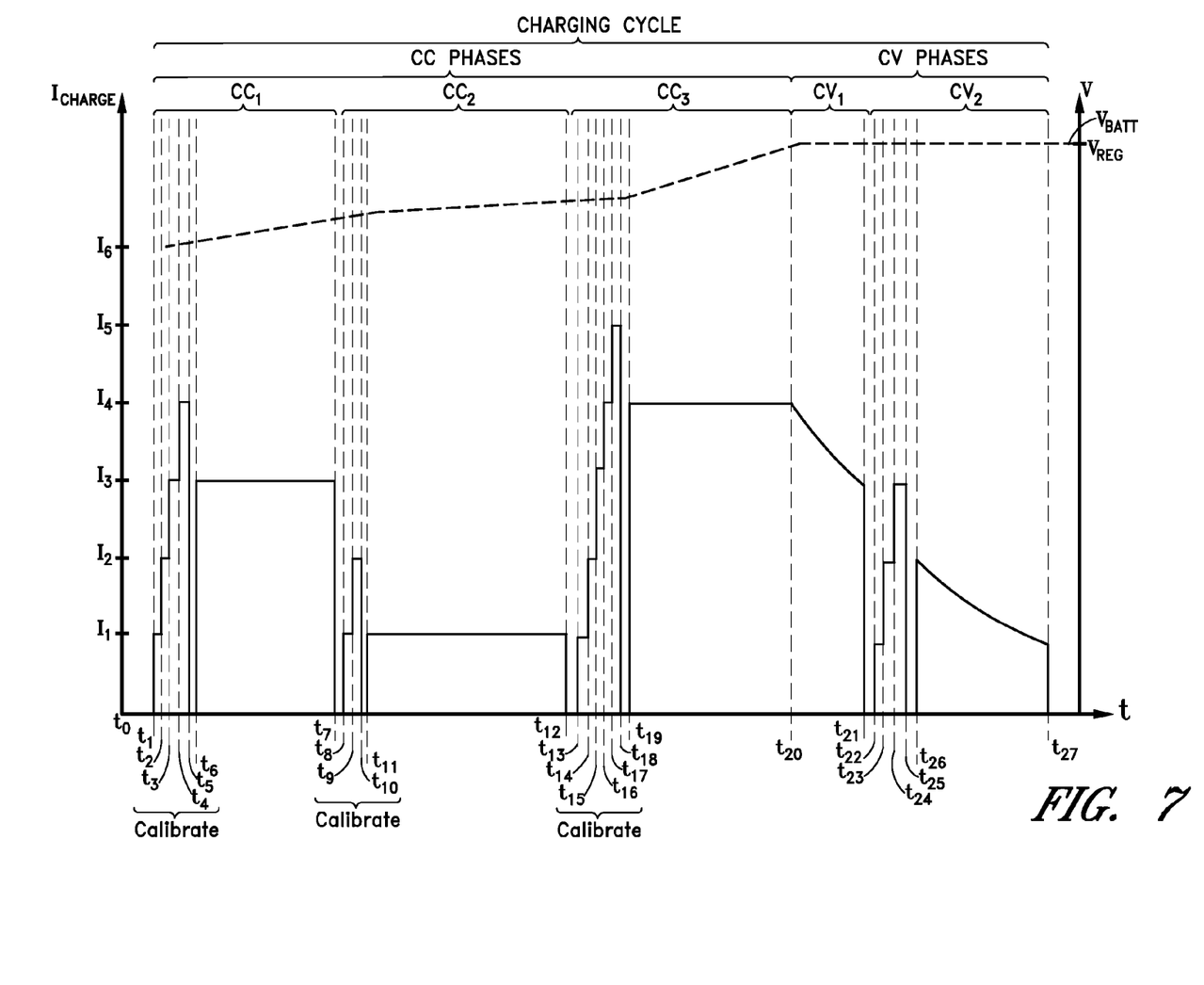
FIG. 7 is a graph showing an exemplary charging current and battery voltage as a function of time in accordance with one embodiment.

FIG. 7 is a graph showing example charging current and battery voltage as a function of time in accordance with one embodiment. The illustrated graph 700 of charging current Icharge can correspond to the charging current provided by the power regulator 310 to the battery 340 in the portable solar battery charger 360. The battery 340 can be a lithium based battery, which can be charged by one or more constant current (CC) phases followed by one or more constant voltage (CV) phases.

The illustrated charging current Icharge can correspond to the charging current provided by the power regulator 310 to the battery 340. As described above with reference to FIGS. 4 and 6A-6B, the feedback circuit 401 of the power regulator 310 can be programmed to run different charging algorithms with programmable charge current profiles and voltage regulation levels, such as, for example, the Icharge profile illustrated in FIG. 7. The power regulator 310 can further include the state machine 412 configured to selectively operate the power regulator 310 in different modes, which can be controlled by microcontroller 320, as was described above The control signals/commands can include, for example, a sequence of charging currents and/or a current step size.

As skilled artisans will recognize, a typical charging cycle include a CC phase followed by a CV phase. However, a typical CC/CV cycle delivering a constant charging current during the CC phase can be inefficient from a power efficiency standpoint, such as, for example, when lighting conditions and corresponding optimal operating points change with time.

The illustrated graph 700 of charging current Icharge includes a multitude of calibration cycles which can be configured to improve the power efficiency of the battery charging. Thus, even as the light intensity provided to the PV array 300 changes as a function of time, such as when a user moves the device from direct sunlight to indoors, the portable solar battery charger 360 can be configured to dynamically adjust the charging current, thereby improving the efficiency of power delivery to the battery 340, as will be described in detail below.

For the purpose of illustration only, the charging current Icharge is shown at time $t_0$ as being a current substantially equal to 0 mA. At a time $t_1$ the microcontroller 320 directs the power regulator 310 to provide a charging current having a value of about $I_1$ to the battery 340. Time $t_1$ can correspond to the initiation of current regulation and the beginning of a CC phase, as was described above with reference to FIGS. 6A-6B. The microcontroller 320 can be configured to initiate battery charging under a variety of conditions. For example, the microcontroller 320 can direct the power regulator 310 to provide a charging current when the voltage level of the battery 340 falls below a battery recharge threshold, as was described above. In one embodiment, the microcontroller 320 initiates a charging cycle when the voltage of the battery 340 falls below a battery recharge threshold and when the voltage of the photovoltaic array (V_PV) is above a trigger voltage when drawing a current of substantially 0 mA from the array.

The illustrated battery recharge cycle includes CC phases and CV phases. The power regulator 310 charges the battery 340 with a substantially constant battery charging current during a given CC phase and a decreasing battery charging current during the CV phases. Referring to the graph 700, the first CC phase $CC_1$ occurs during the time $t_1$-$t_7$, the second CC phase $CC_2$ occurs between the time $t_7$-$t_{12}$, and the third CC phase $CC_3$ occurs between the time $t_{12}$-$t_{20}$. Although three CC phases have been illustrated in FIG. 7, this is for illustrative purposes only, and any number of CC phases may occur. In one embodiment, the CC phases are selected to be between about 10 s-1 min apart, and the total length of all CC phases is selected to be between about 8 min and 2 hours.

At time $t_{20}$, the charge capacity of the battery 340 can reach a certain point, such as, for example, about 75% to 85%. At this point the battery 340 may not be fully charged, and one or more CV phases can begin to further increase the charge capacity. In one embodiment, the first CV phase begins when the voltage of the battery 340 is equal to about the regulated voltage at the output of the power regulator 310. In one embodiment, the regulated voltage is selected to be in the range of about 4.1V to 4.3V, or more particularly, 4.15V to 4.25V. The first CV phase $CV_1$ occurs during times $t_{20}$-$t_{21}$, and the second CV phase $CV_2$ occurs during times $t_{21}$-$t_{27}$. Although two CV phases have been illustrated in FIG. 7, this is for illustrative purposes only, and any number of CV phases may occur. In one embodiment, the CV phases are selected to be between about 10 s-1 min apart. In another embodiment, a subsequent CV phase begins when the comparison signal from the comparator 403 indicates that the voltage of the photovoltaic array 300 is below the threshold voltage Vx. This may indicate that the light intensity received at the photovoltaic array 300 has decreased since the microcontroller 320 last calibrated the charging current.

The illustrated graph 700 of charging current Icharge includes a multitude of calibration cycles which can be configured to improve the power efficiency associated with charging the battery 340. A first calibration cycle is illustrated in graph 700 between times $t_2$ and $t_6$, the operation of which can be similar to that described above with reference to FIGS. 6A-6B. The first calibration can serve to calibrate the amplitude of the current Icharge to a level that is near the maximum power point associated with the lighting conditions received by the photovoltaic array 300 during times $t_2$ through $t_6$. Thus, a user may be indoors during this time period and the microcontroller 320 can calibrate the charge current provided by the power regulator 310 to a level that is power-efficient.

A second calibration cycle is illustrated in graph 700 between times $t_7$ and $t_{11}$, the operation of which can be similar to that of the first calibration cycle. The second calibration cycle can be initiated by the microcontroller 320 after a time delay has elapsed. In one embodiment, the microcontroller 320 initiates calibration cycles periodically during current regulation, wherein the period between calibrations is selected to be between about 20 s and 1 min. The current level Icharge can be adjusted based on this second calibration, and may reflect a change of lighting conditions received by the photovoltaic array 300. For example, the user may have moved the portable solar battery charger 360 indoors. One or more additionally calibration cycles can subsequently occur during current regulation, such as the third calibration cycle illustrated as occurring during times $t_{13}$-$t_{19}$. The operation of the additional calibration cycles can be similar to that described above.

One or more calibration cycles can occur during voltage regulation. During a CV phase, the voltage of the battery 340 (Vbatt) can be held constant by the power regulator 310, while the level of charge on the battery 340 increases. This can result in a charging current Icharge that decreases in time. In one embodiment, a calibration cycle occurs when the lighting conditions decrease and the power regulator 310 can no longer supply the selected Icharge current. For example, the lighting conditions can decrease at time $t_{13}$ when a user moves from direct sunlight to inside a car. This can result in the photovoltaic array 300 being unable to supply the desired charging current. In one embodiment, a calibration during voltage regulation is when the comparison signal from the comparator 403 indicates that the voltage of the photovoltaic array 300 is below the threshold voltage Vx. However, the microcontroller 320 can be configured to initiate a calibration during voltage regulation under other circumstances. For example, the microcontroller 320 can be configured to periodically initiate calibration, for example, about every 35 s.

With continuing reference to FIG. 7, the graph 700 illustrates a method of controlling the power-efficient delivery of a charging current to a battery 340. The method avoids complex designs, such as power point tracking algorithms using dithering, which can be complex and expensive, can require numerous external sensing signals, can be subject to finding false operating points located at local maxima on the P-V curve, and can consume significant amounts of power in its implementation. The method can allow the battery 340 to be charged efficiently as a user moves the portable solar battery charger 360 through a variety of lighting conditions. Thus, by providing improving the power efficiency associated with the charge current provided to the battery 340, the charge capacity of the battery 340 can be increased quickly, allowing a user to rapidly charge one or more portable user devices 350.

Figure 8:
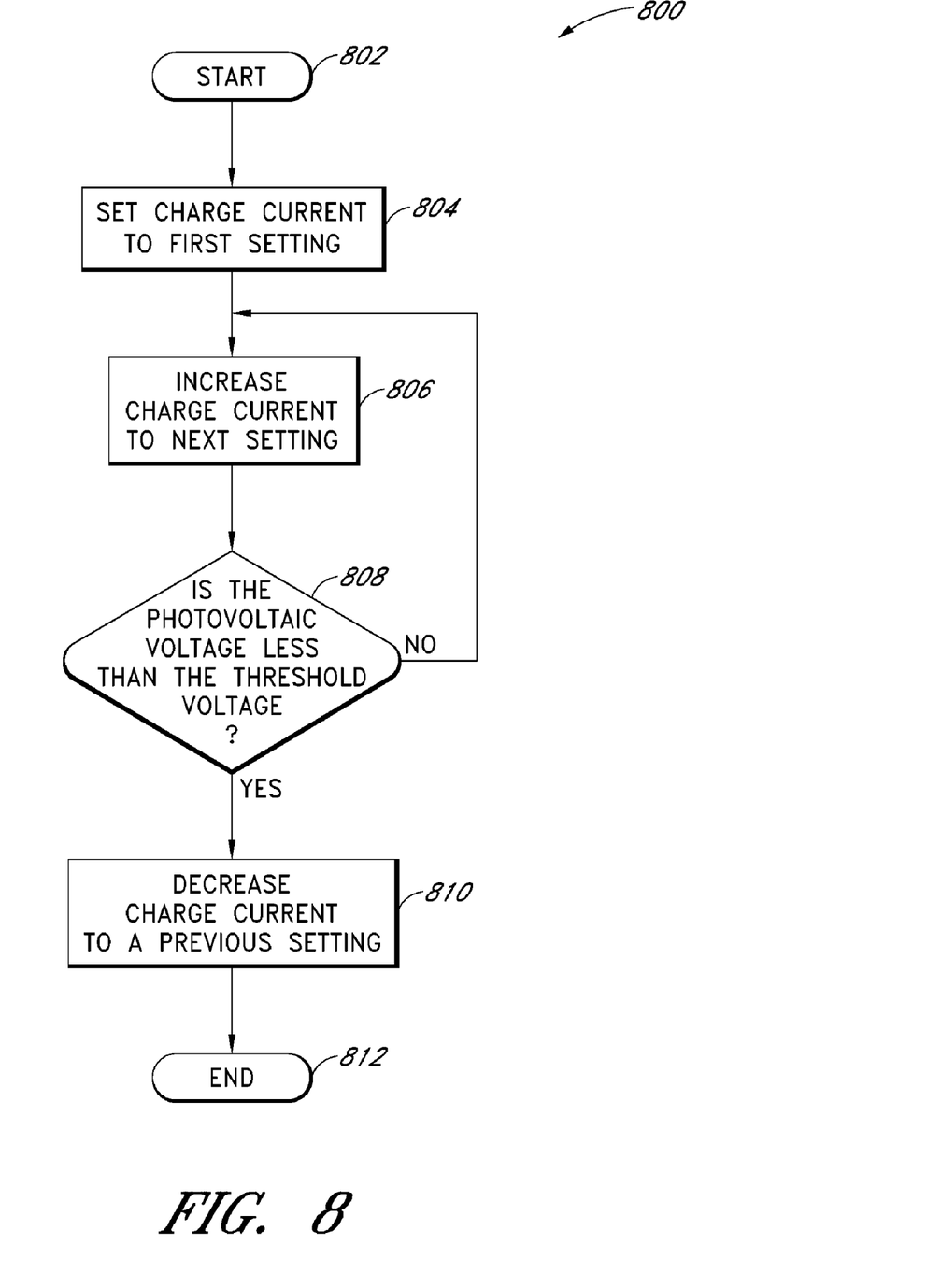
FIG. 8 is a flow chart illustrating a method of calibrating a charging current in accordance with one embodiment.

FIG. 8 is a flow chart illustrating a method of calibrating a charging current in accordance with one embodiment. It will be understood that this method can be modified without departing from the spirit and scope of the invention. The illustrated method 800, depicted from the point of view of portable solar battery charger 360, starts at 802. In an ensuing step 804, the portable solar battery charger 360 sets the charging current to a first setting. This step can be performed by the microcontroller 320, and can involve the microcontroller 320 providing one or more control signals/commands to the power regulator 310 to control the charge current provided by the power regulator 310 to the battery 340. For example, the control signals/commands may be communicated to the state machine 412 of the power regulator 310 directly via dedicated pins or through a standard interface such as an I²C interface. The control signals/commands can include a sequence of charging currents and/or a current step size, as was described above with reference to FIGS. 6A-7.

Next, in a step 806, the portable solar battery charger 360 increases the charge current to the next setting. This step can be performed by the microcontroller 320, and can involve the microcontroller 320 providing one or more control signals/commands to the power regulator 310. The details of this are similar to that described above with respect to step 804. In an ensuing decision step 808, the portable solar battery charger 360 determines whether the photovoltaic voltage is less than a threshold voltage. This step can be performed, for example, by the comparator 403. For example, as was described above with reference to FIG. 4, the comparator 403 can be configured to receive the voltage from the photovoltaic array 300 and to compare the received voltage to a reference voltage Vx. The comparator 403 can generate a comparison signal indicative of the result of the comparison, which can be provided to, for example, the microcontroller 320 or PWM circuit 408. If the answer to the inquiry in decision step 808 is no, the method 800 returns to the step 806.

If the answer to the inquiry in decision step 808 is yes, then the method proceeds to a step 810, in which the portable solar battery charger 360 decreases the charge current to a previous setting. This step can be performed by the microcontroller 320, and can involve the microcontroller 320 providing one or more control signals/commands to the power regulator 310.

In one embodiment, the microcontroller 320 can step the biasing point back by one step, as described above with reference to FIGS. 6A-6B. In another embodiment, the microcontroller 320 can step the biasing point back by N number of steps, where N is selected to greater than one. The method ends at a step 812.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A battery charger comprising:

a photovoltaic array having a first face adapted to receive light and a second face opposite the first face;

a first body portion having an opening therethrough, wherein the opening is configured to allow light to reach the first face of the photovoltaic array;

a second body portion, wherein the second body portion is mateable with the first body portion along a parting plane running substantially parallel to a plane containing the mouth of the opening;

a redistribution layer configured to electrically connect to the second face of the photovoltaic array;

a battery;

a heat sink positioned between the battery and the photovoltaic array, wherein the heat sink is configured to absorb thermal energy emanating from the photovoltaic array;

a printed circuit board having at least one integrated circuit, wherein the printed circuit board is configured to electrically connect to the battery and the redistribution layer; and a display, wherein the display is configured to be visible through the opening of the first body portion, wherein when the first and second body portions are assembled, the first and second body portions define a cavity containing the PV array, the redistribution layer, the battery, the heat sink, the printed circuit board, and the display.

* * * * *